(12) United States Patent
Mizuno

(10) Patent No.: US 11,239,031 B2
(45) Date of Patent: Feb. 1, 2022

(54) MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 66 days.

(21) Appl. No.: 16/056,172

(22) Filed: Aug. 6, 2018

(65) Prior Publication Data

US 2019/0051459 A1 Feb. 14, 2019

(30) Foreign Application Priority Data

Aug. 8, 2017 (JP) .................................. 2017-153390
May 7, 2018 (JP) .................................. 2018-089092

(51) Int. Cl.
*H01G 4/30* (2006.01)
*H01G 4/008* (2006.01)
(Continued)

(52) U.S. Cl.
CPC ........... *H01G 4/1227* (2013.01); *H01G 4/008* (2013.01); *H01G 4/0085* (2013.01); *H01G 4/012* (2013.01); *H01G 4/30* (2013.01)

(58) Field of Classification Search
CPC .......... H01G 4/30; H01G 4/005; H01G 4/008; H01G 4/1227; H01G 4/0085; H01G 4/012
(Continued)

(56) References Cited

U.S. PATENT DOCUMENTS

2009/0067117 A1\* 3/2009 Kasuya ................. H01G 4/30
361/321.2
2013/0094121 A1\* 4/2013 Endo ...................... H01G 4/12
361/305
(Continued)

FOREIGN PATENT DOCUMENTS

JP 2007173480 A 7/2007
JP 2013157593 A 8/2013
(Continued)

OTHER PUBLICATIONS

A Notice of Reasons for Refusal issued by the Japanese Patent Office, dated Nov. 30, 2021, for Japanese counterpart application No. 2018-089092 (3 pages).

*Primary Examiner* — Arun Ramaswamy
(74) *Attorney, Agent, or Firm* — Law Office of Katsuhiro Arai

(57) ABSTRACT

A multilayer ceramic capacitor includes: a multilayer structure in which each of dielectric layers and each of internal electrode layers are alternately stacked, a main component of the dielectric layers being ceramic, wherein: the multilayer structure comprises surface portions and a center portion in a stacking direction of the dielectric layers and the internal electrode layers, the surface portions having a first thickness from a surface of the multilayer structure, the center portion being next to the surface portion in the stacking direction and having a second thickness; and an average length of crystal grains of a main component metal of the internal electrode layers of the surface portions is 0.8 times or less than an average length of crystal grains of a main component metal of the internal electrode layers of the center portion.

11 Claims, 9 Drawing Sheets

(51) Int. Cl.
*H01G 4/012* (2006.01)
*H01G 4/12* (2006.01)

(58) Field of Classification Search
USPC .............. 361/321.2, 301.4, 303, 321.1, 305
See application file for complete search history.

(56) References Cited

U.S. PATENT DOCUMENTS

| | | | |
|---|---|---|---|
| 2013/0135789 A1* | 5/2013 | Kim | H01G 4/30 |
| | | | 361/321.2 |
| 2013/0194715 A1 | 8/2013 | Kim et al. | |
| 2013/0342956 A1* | 12/2013 | Konishi | H01G 4/30 |
| | | | 361/301.4 |
| 2014/0022692 A1 | 1/2014 | Yoon et al. | |

FOREIGN PATENT DOCUMENTS

| | | |
|---|---|---|
| JP | 2014022721 A | 2/2014 |
| JP | 2014146752 A | 8/2014 |

\* cited by examiner 5.00 μm

CRYSTAL GRAINS ARE SMALL.

CRYSTAL GRAINS ARE LARGE.

CRYSTAL GRAINS ARE SMALL.

CRYSTAL GRAINS ARE SMALL.

CRYSTAL GRAINS ARE LARGE.

CRYSTAL GRAINS ARE LARGE.

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2017-153390, filed on Aug. 8, 2017 and the prior Japanese Patent Application No. 2018-089092, filed on May 7, 2018, the entire contents of which are incorporated herein by reference.

FIELD

A certain aspect of the present invention relates to a multilayer ceramic capacitor and a manufacturing method of a multilayer ceramic capacitor.

BACKGROUND

A multilayer ceramic capacitor has a multilayer structure in which each of dielectric layers and each of internal electrode layers are alternately stacked, and cover sheets are provided on an upper face and a lower face of the multilayer structure in a stacking direction (for example, see Japanese Patent Application Publication No. 2007-173480, Japanese Patent Application Publication No. 2013-157593 and Japanese Patent Application Publication No. 2014-22721). In the multilayer structure, a capacity region in which internal electrode layers face with each other generates electrical capacity. When cover sheets are provided, reliability of the multilayer ceramic is secured.

SUMMARY OF THE INVENTION

For the purpose of downsizing the multilayer ceramic capacitor and enlarging capacity of the multilayer ceramic capacitor, it is demanded that a volume of the capacity region is enlarged and a thickness of the cover sheet is reduced. However, when the thickness of the cover sheets is reduced, strength of the cover sheets may be small. In this case, a thermal shock crack may occur. And, it may be difficult to secure the reliability. And so, it is thought that crystal grains of the internal electrode layer are made finer and the number of the crystal grains is enlarged. However, in this case, the ESR (Equivalent Series Resistance) may be large.

The present invention has a purpose of providing a multilayer ceramic capacitor and a manufacturing method of a multilayer ceramic capacitor that are capable of suppressing an ESR and securing reliability.

According to an aspect of the present invention, there is provided a multilayer ceramic capacitor including: a multilayer structure in which each of dielectric layers and each of internal electrode layers are alternately stacked, a main component of the dielectric layers being ceramic, wherein: the multilayer structure comprises surface portions and a center portion in a stacking direction of the dielectric layers and the internal electrode layers, the surface portions having a first thickness from a surface of the multilayer structure, the center portion being next to the surface portion in the stacking direction and having a second thickness; and an average length of crystal grains of a main component metal of the internal electrode layers of the surface portions is 0.8 times or less than an average length of crystal grains of a main component metal of the internal electrode layers of the center portion.

According to another aspect of the present invention, there is provided a manufacturing method of a multilayer ceramic capacitor including: a first step of forming a first pattern of a metal conductive paste on a green sheet including main component ceramic powders, a second step of stacking lamination units obtained by repeating of the first step so that each first pattern is alternately shifted; a third step of providing cover sheets including main component ceramic powders on an upper face and a lower face of a ceramic multilayer structure in a stacking direction of the ceramic multilayer structure obtained by the second step, and compressing the cover sheets toward the upper face and the lower face; and a fourth step of forming a multilayer structure in which each of dielectric layers and each of internal electrode layers are alternately stacked, by baking the ceramic multilayer structure obtained by the third step, wherein: the multilayer structure comprises surface portions and a center portion in a stacking direction of the dielectric layers and the internal electrode layers, the surface portions having a first thickness from a surface of the multilayer structure, the center portion being next to the surface portion in the stacking direction and having a second thickness; and a filling condition of the third step is adjusted so that an average length of crystal grains of a main component metal of the internal electrode layers of the surface portions is 0.8 times or less than an average length of crystal grains of a main component metal of the internal electrode layers of the center portion.

DETAILED DESCRIPTION

A description will be given of an embodiment with reference to the accompanying drawings.

[Embodiment]

Figure 1:
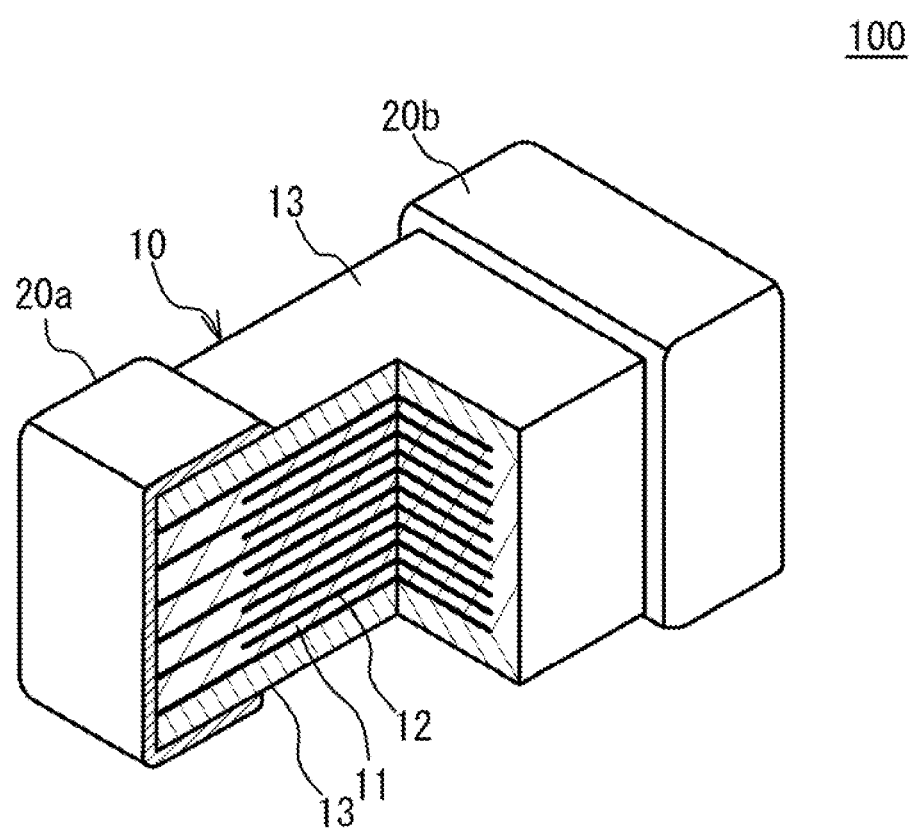
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component ceramic of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. A thickness of the internal electrode layer 12 is, for example, 0.5 μm or less. It is preferable that the thickness of the internal electrode layer 12 is 0.3 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yT_{11-z}Zr_zO_3$ ($0 \leq x \leq 1$, $0 \leq y \leq 1$, $0 \leq z \leq 1$) having a perovskite structure.

With respect to the multilayer ceramic, downsizing, enlargement of capacity, and securing of reliability are required. In order to downsize the multilayer ceramic capacitor and enlarging the capacity of the multilayer ceramic capacitor, it is thought that a volume ratio of a capacity region is enlarged and the thickness of the cover layer 13 is reduced. The capacity region is a region in which the internal electrode layers 12 face with each other and electrical capacity is generated. In this case, strength of the cover layer 13 may be small, and a thermal shock crack may occur. Thereby, the reliability may not be necessarily secured. And so, the multilayer ceramic capacitor 100 has a structure securing the reliability even if the thickness of the cover layer 13 is reduced.

Figure 2:
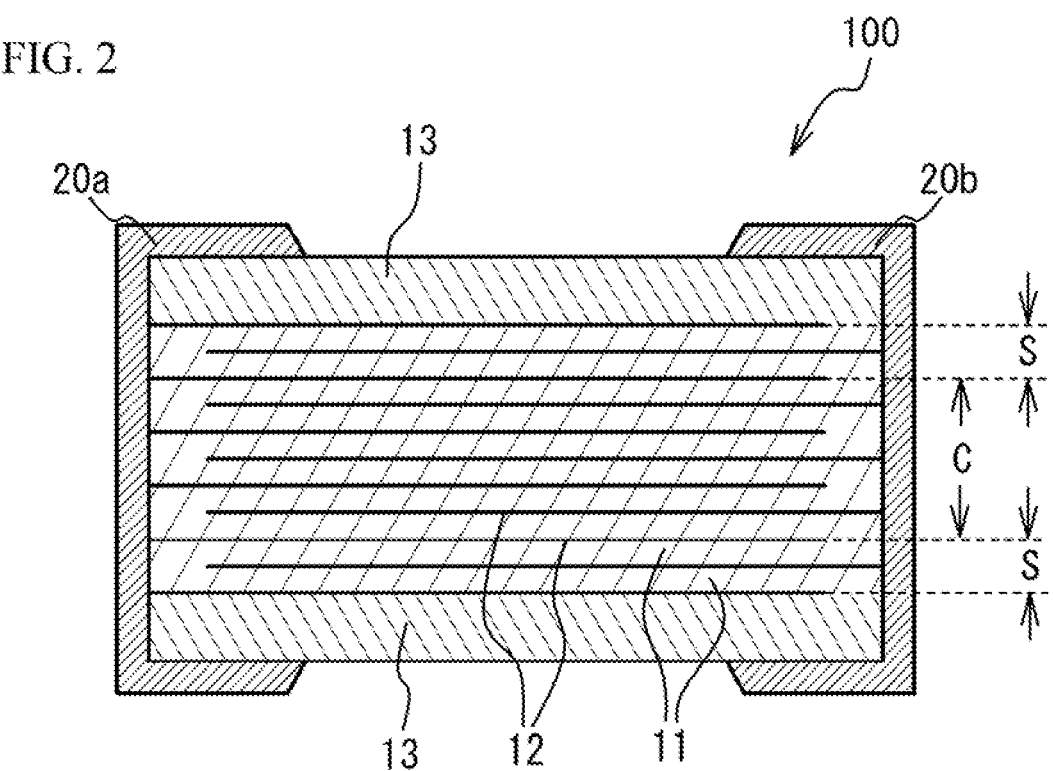
FIG. 2 illustrates surface portions and a center portion.

As illustrated in FIG. 2, in a multilayer structure without the cover layers 13 in which each of the dielectric layers 11 and each of the internal electrode layers 12 are alternately stacked so as to face with each other, surface portions S are parts of the multilayer structure having a first thickness from an upper face of the multilayer structure and from a lower face of the multilayer structure, and a center portion C is a part of the multilayer structure that has a second thickness and is next to the surface portions S. An average length of crystal grains of the main component metal of the internal electrode layers 12 of the surface portions S is smaller than an average length of crystal grains of the main component metal of the internal electrode layers 12 of the center portion C. In this structure, the number of the crystal grain boundaries of the main component metal of the internal electrode layers 12 of the surface portions S is large, the crystal grain boundaries suppress sliding of the crystal grains, and the strength of the internal electrode layers 12 of the surface portions S increases. Therefore, the thermal shock resistance is improved. Therefore, even if the thickness of the cover layer 13 is reduced, it is possible to secure the reliability.

When the average length of the crystal grains of the main component metal of the internal electrode layers 12 of the surface portions S is not sufficiently smaller than the average length of the crystal grains of the main component metal of the internal electrode layers 12 of the center portions C, the number of the crystal grain boundaries of the main component metal of the internal electrodes 12 of the surface portions S may not be necessarily sufficiently large. And so, in the embodiment, the average length of the crystal grains of the main component metal of the internal electrode layers 12 of the surface portions S is 0.8 times or less than the average length of the crystal grains of the main component metal of the internal electrode layers 12 of the center portion C.

When the average length of the crystal grains of the main component metal of the internal electrode layers 12 in both of the surface portions S and the center portion C is small, an ESR (equivalent series resistance) may be large. On the other hand, in the embodiment, the ESR of whole of the multilayer ceramic capacitor 100 is suppressed, because the average length of the crystal grains of the main component metal of the internal electrode layers 12 of the center portion C is larger than the average length of the crystal grains of the main component metal of the internal electrode layers 12 of the surface portion S.

It is preferable that the first thickness of the surface portion S is 1/10 of a size of the multilayer structure in the stacking direction. In this case, the region of the surface portion S is not excessively large, and the region of the center portion C is not excessively large. It is therefore possible to improve the thermal shock resistance and suppress the increasing of the ESR.

When the internal electrode layers 12 are formed by baking metal powders, the internal electrode layers 12 tend to be spheroidized in order to minimize the surface energy as the sintering progresses. The sintering of the metal component of the internal electrode layers 12 progresses faster than the sintering of the main component ceramic of the dielectric layers 11. Therefore, when the temperature of the dielectric layers 11 is raised until the main component ceramic of the dielectric layers 11 is sintered, the metal component of the internal electrode layers 12 is excessively sintered and the metal component tends to be spheroidized. In this case, when there is a reason (defect) of break, the internal electrode layer 12 is broken from the defect and the continuity modulus decreases. When the continuity modulus of the internal electrode layer 12 decreases, the strength of the internal electrode layer 12 may be reduced. Even if a high continuity modulus is kept, desirable strength of the internal electrode layer 12 may not be necessarily achieved when the thickness of the internal electrode layer 12 is reduced. When the desirable strength of the internal electrode layer 12 is not achieved, a crack may occur in the multilayer ceramic capacitor 100 because of mechanical shock during a mounting.

Figure 3:
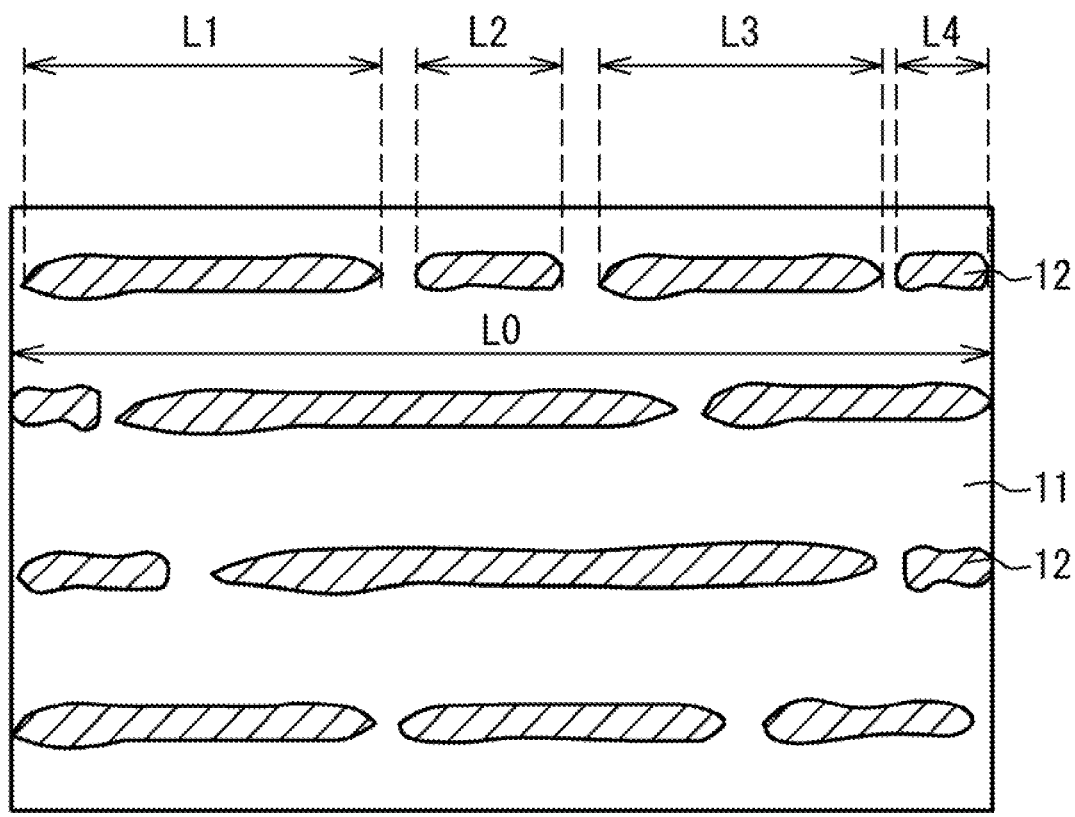
FIG. 3 illustrates a continuity modulus.

FIG. 3 illustrates the continuity modulus. As illustrated in FIG. 3, in an observation area having a length L0 in the internal electrode layer 12, lengths L1, L2 to Ln of metal portions are measured and summed. A ratio of the metal portions Σ Ln/Lo can be defined as the continuity modulus.

Figure 4A:
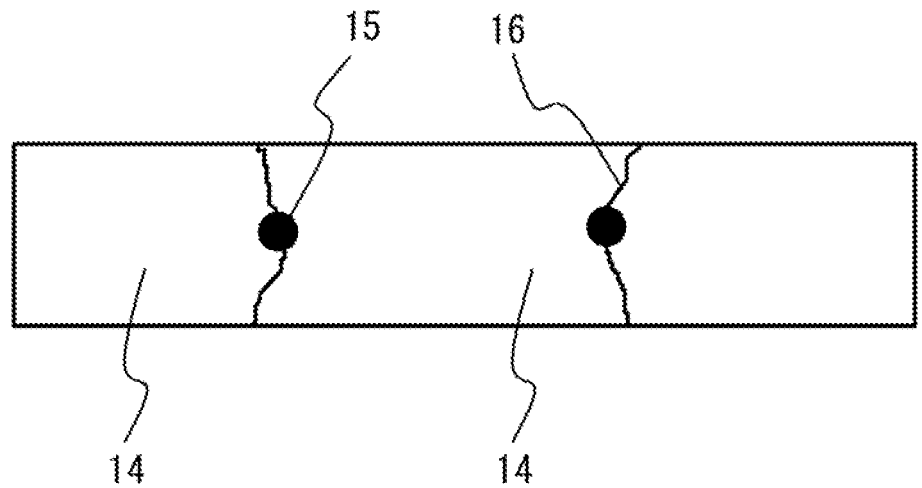
FIG. 4A illustrates an internal electrode layer in a case where a crystal grain diameter is large.
Figure 4B:
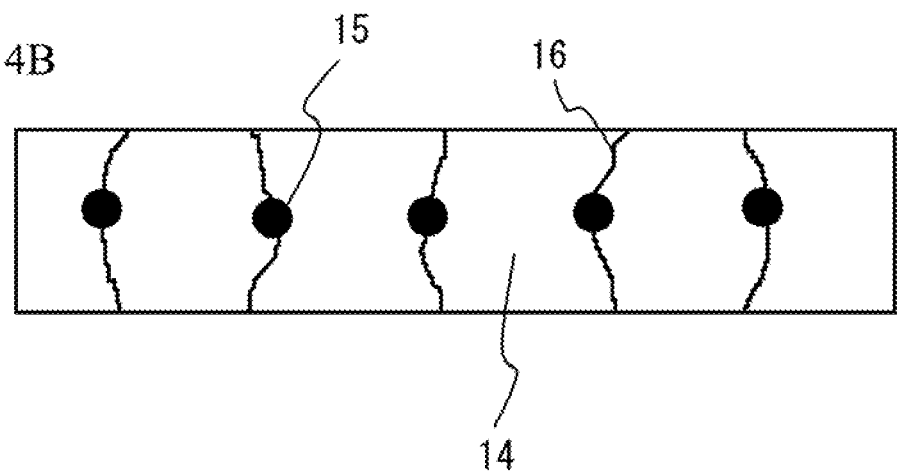
FIG. 4B illustrates an internal electrode layer in a case where a crystal grain diameter is small.

And so, it is preferable that a crystal grain diameter of the internal electrode layer 12 is small. FIG. 4A illustrates the internal electrode layer 12 in a case where the crystal grain diameter is large. FIG. 4B illustrates the internal electrode layer 12 in a case where the crystal grain diameter is small. As illustrated in FIG. 4A and FIG. 4B, when a crystal grain 14 is small, the number of crystal grain boundaries 16 is large. Thus, strength of the internal electrode layer 12 is large. In concrete, it is preferable that the number of the crystal grain boundaries is 1.0 µm or more in an extension direction of the internal electrode layers 12, in the internal electrode layers in the center portion C. The extension direction of the internal electrode layers 12 is a direction from the external electrode 20a to the external electrode 20b. In a region where the extension direction of the internal electrode layers 12 is inclined with respect to the direction from the external electrode 20a to the external electrode 20b, the extension direction of the internal electrode layers 12 is a direction of the inclination. With the structure, the number of the crystal grain boundaries is sufficiently large. It is preferable that the number of the crystal grain boundaries is 1.8/µm or more in the extension direction of the internal electrode layers 12, in the internal electrode layers 12 in the center portion C. A grain (co-material) 15 of which a main component is ceramic is left in the internal electrode layers 12. In this case, excessive sintering of a metal component of the internal electrode layers 12 during sintering is suppressed. And a breaking of the internal electrode layers 12 is suppressed. Therefore, a continuity modulus of the internal electrode layers 12 becomes larger. When the continuity modulus of the internal electrode layers 12 becomes larger, the strength of the internal electrode layers 12 becomes larger. Accordingly, the strength of the multilayer ceramic capacitor 100 becomes larger, and a crack is suppressed.

From a viewpoint of the average length of the grain crystals, it is preferable that the average length of the crystal grains is 0.7 µm or less in the extension direction of the internal electrode layers 12, in the internal electrode layers 12 of the center portion C.

In order to suppress increasing of the ESR of the whole of the multilayer ceramic capacitor 100, it is preferable that an average thickness "a" of the internal electrode layers 12 of the center portion C is larger than the average thickness "a" of the internal electrode layers 12 of the surface portions S. In order to achieve the effect sufficiently, it is preferable that the average thickness "a" of the internal electrode layers 12 of the center portion C is 1.2 times or more than the average thickness "a" of the internal electrode layers 12 of the surface portion S.

Figure 5A:
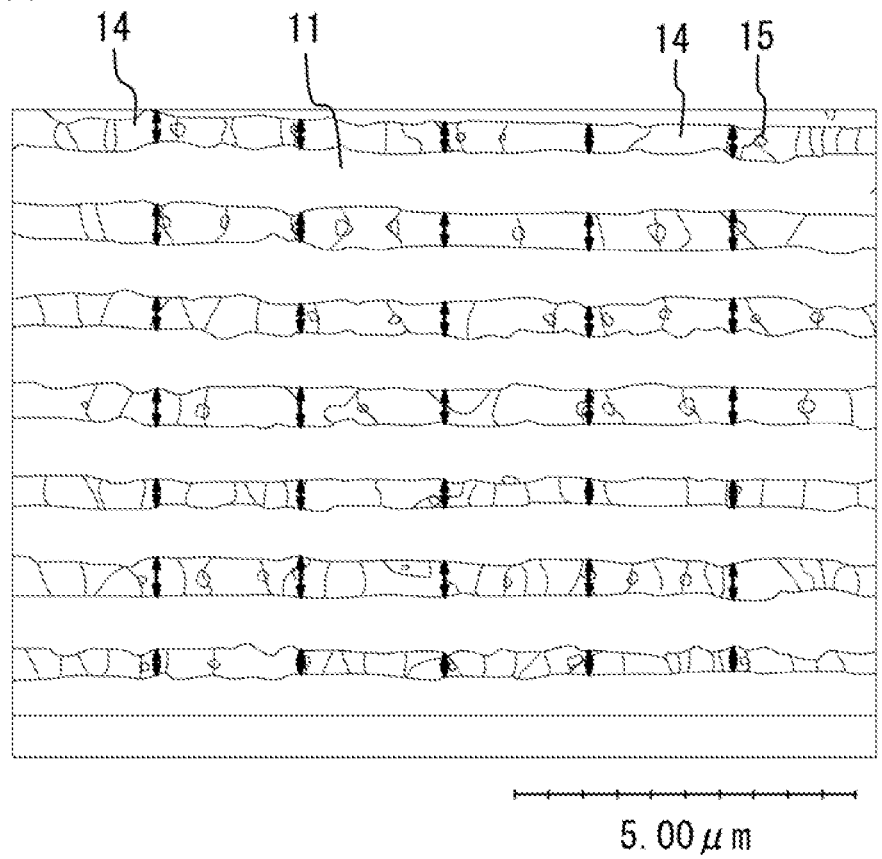
FIG. 5A illustrates a measured thickness of internal electrode layers.

The average thickness of the internal electrode layers 12 may be a measured result illustrated in FIG. 5A. The average thickness "a" may be an average value of measured results of the thicknesses of a plurality of points in the internal electrode layers 12 that are observed in the cross section in parallel with the stacking direction. For example, as illustrated in FIG. 5A, the thickness "a" is an average value of thicknesses of a plurality of points (ranges indicated with arrows in FIG. 5A) of the internal electrode layers 12 at even intervals in the extension direction of the internal electrode layers 12. The thicknesses of a specific internal electrode layer 12 may be measured. The thicknesses of each of a plurality of internal electrode layers 12 may be measured, and an average of the measured thicknesses may be used as the thickness "a" of the internal electrode layers 12 of the surface portion S. For example, an average of the thicknesses of a specific internal electrode layer 12 of the surface portion S may be the average thickness "a" of the internal electrode layers 12 of the surface portion S. An average of the thicknesses of two or more of the internal electrode layers 12 or all of the internal electrode layers 12 of the surface portion S may be the average thickness "a" of the internal electrode layers 12 of the surface portion S. An average of the thicknesses of a specific internal electrode layer 12 of the center portion C may be the average thickness "a" of the internal electrode layers 12 of the center portion C. An average of the thicknesses of two or more of the internal electrode layers 12 or all of the internal electrode layers 12 of the center portion C may be the average thickness "a" of the internal electrode layers 12 of the center portion C. The number of the points for calculating the average thickness of the internal electrode layers 12 may be 200 that are randomly selected from an object region.

Figure 5B:
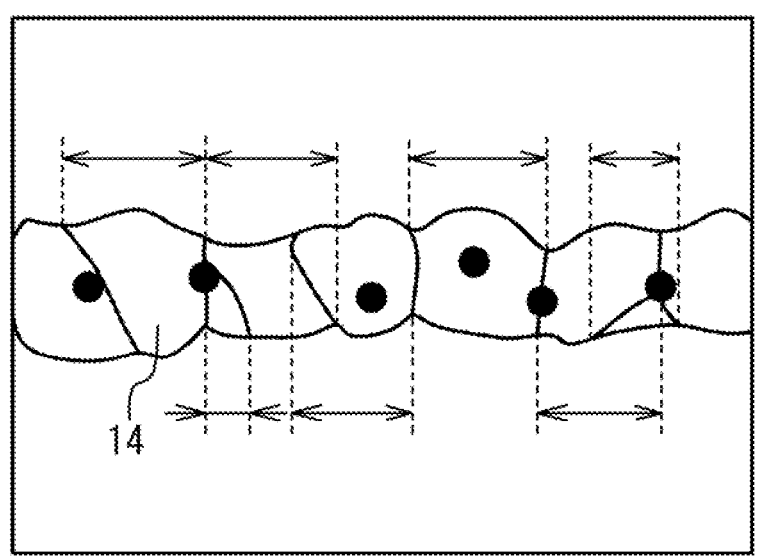
FIG. 5B illustrates a measured length of crystal grains of internal electrode layers.

The length of crystal grains may be a maximum length (ranges indicated with arrows in FIG. 5B) of each crystal grain 14 in the extension direction of the internal electrode layers 12, as illustrated in FIG. 5B. The extension direction is a direction in which the two external electrodes 20a and 20b face with each other. Therefore, the average length "b" of the crystal grains 14 is an average length of each crystal grain 14 in the extension direction of the internal electrode layers 12 within a predetermined range of a cross section (the cross section of FIG. 2) regulated by the direction in which the two external electrodes face with each other and the stacking direction of the internal electrode layers 12. For example, an average of the length of each crystal grain 14 within a predetermined range of a specific internal electrode layer 12 of the surface portion S may be the average length "b" of the crystal grains 14 of the internal electrode layers 12 of the surface portion S. An average of the length of each crystal grain 14 within the predetermined range of two or more of the internal electrode layers 12 or all of the internal electrode layers 12 of the surface portion S may be the average length "b" of the crystal grains 14 of the internal electrode layers 12 of the surface portion S. An average of the lengths of the crystal grains 14 of a specific internal electrode layer 12 of the center portion C may be the average length "b" of the crystal grains 14 of the internal electrode layers 12 of the center portion C. An average of the lengths of the crystal grains 14 of two or more of the internal electrode layers 12 or all of the internal electrode layers 12 of the center portion C may be the average length "b" of the crystal grains 14 of the internal electrode layers 12 of the center portion C. The number of the points for calculating the average length "b" of the crystal grains 14 of the internal electrode layer 12 may be 200 that are randomly selected from an object region.

Figure 6:
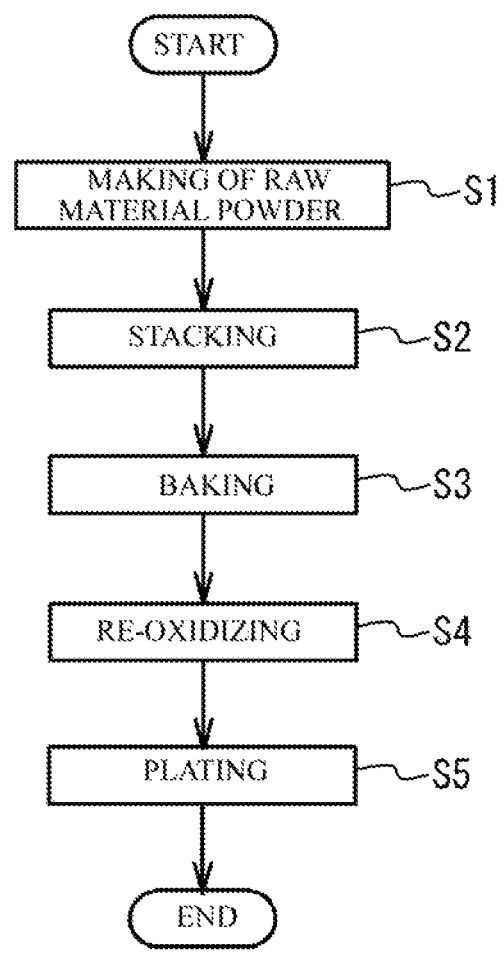
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making Process of a Raw Material Powder)

As illustrated in FIG. 6, a dielectric material for forming the dielectric layer 11 is prepared. An A site element and a B site element of the dielectric layer 11 are generally included in the dielectric layer 11 in a shape of sintered structure of grains of $ABO_3$. For example, $BaTiO_3$ is tetragonal compound having a perovskite structure and has a high dielectric constant. $BaTiO_3$ can be obtained by reacting a titanium material such as titanium dioxide with a barium material such as barium carbonate and synthesizing barium titanate. Various methods are known as a synthesizing ceramic of the dielectric layer 11. For example, a solid-phase method, a sol-gel method, a hydrothermal method and so on are known. In the embodiment, any one of them can be adopted.

Next, additive compound may be added to a ceramic powder material, in accordance with purposes. The additive compound may be an oxide of Mo, Nb, Ta, W, Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon), or glass.

In the embodiment, it is preferable that compound including additive compound is mixed with the ceramic grains structuring the dielectric layer 11. The resulting ceramic grains with the additive compound are calcined within a temperature range of 820 degrees C. to 1150 degrees C. Then, the ceramic grains are wet-blended with the additive compound. After that, the ceramic grains with the additive compound are dried and crushed. And, desirable ceramic powder is prepared. For example, it is preferable that an average grain diameter of the ceramic powder is 50 nm to 300 nm from a viewpoint of reducing the thickness of the dielectric layer 11. For example, the grain diameter of the resulting ceramic may be adjusted by crushing the resulting ceramic powder. Alternatively, the grain diameter may be adjusted by performing the crushing and a classifying process.

(Stacking Process)

Next, a binder such as polyvinyl butyral (PVB) resin, an organic solvent such as ethanol or toluene, and a plasticizer such as dioctyl phthalate (DOP) are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming an internal electrode layer with use of screen printing or gravure printing. The conductive paste includes an organic binder. Thus, internal electrode layer patterns that are alternately extracted to the pair of external electrodes are provided. A metal material of the metal conductive paste has an average grain diameter of 100 nm or less. A standard deviation of the grain diameter is 15 or less. In this case, sharp grain size distribution is obtained. It is preferable that the average grain diameter is 100 nm or less. It is more preferable that the average grain diameter is 70 nm or less. It is preferable that the standard deviation of the grain diameter is 15 or less. It is more preferable that the standard deviation of the grain diameter is 12 or less. An inclination of accumulated grain size distribution is 8 or more. The inclination of the accumulated grain size distribution can be defined as an inclination (=1/(log D80−log D20)) between D20 and D80 in a case where the accumulated grain size distribution is plotted in a logarithmic manner.

As a co-material, ceramic grains are added to the metal conductive paste. A main component ceramic of the ceramic grains is not limited. However, it is preferable that a main component ceramic of the co-material is the same as that of the dielectric layer 11. For example, barium titanate may be evenly dispersed. For example, ceramic grains of which an average grain diameter is 10 nm or less are used as the co-material. The standard deviation of the grain diameter is 5 or less. Thus, sharp grain size distribution is achieved. It is preferable that the average grain diameter is 15 nm or less. It is more preferable that the average grain diameter is 10 nm or less. It is preferable that the standard deviation of the grain diameter is 5 or less. It is more preferable that the standard deviation of the grain diameter is 3 or less. It is preferable that the inclination of the accumulated grain size distribution is 7 or more. The inclination of the accumulated grain size distribution can be defined as an inclination (=1/(log D80−log D20)) between D20 and D80 in a case where the accumulated grain size distribution is plotted in a logarithmic manner.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are provided on the stacked dielectric green sheets and under the stacked dielectric green sheets. The cover sheets are sandwiched by silicone rubber sheets having a base made of PET (polyethylene terephthalate). And the cover sheet are compressed. The silicone rubber sheets are soft. Therefore, when the silicone rubber sheets have a sufficiently large thickness, the whole of the sheets is evenly compressed. When the compressing force is enlarged, the whole of the sheets is finely crystallized. When the compressing force is lowered, the whole of the sheets is roughly crystallized. When thin silicone rubber sheets are used, only outer portions are strongly compressed by the rigid PET of the base. Therefore, a difference may occur between an internal filling condition and an outer filling condition. And so, in the embodiment, relatively thinner silicone rubber sheets are used. With the compressing, the filing degree near the cover sheet 13 is enlarged. It is therefore possible to promote the fine crystallization of the main component metal of the internal electrode layers 12 of the surface portions S. For example, when the thickness of the silicone rubber sheet is adjusted, the average length of the crystal grains of the main component metal of the internal electrode layers 12 of the surface portion S after the baking is 0.8 times or less than the average length of the crystal grains of the main component metal of the internal electrode layers 12 of the center portion C.

The resulting multilayer structure is cut into a predetermined size (for example, 1.0 mm×0.5 mm). After that, a metal conductive paste, which is to be the ground layer of the external electrodes 20a and 20b is coated on the both edge faces of the resulting multilayer structure by a dip method or the like and is dried. Thus, a compact of the multilayer ceramic capacitor 100 is obtained.

(Baking Process)

Next, after removing the binder in $N_2$ atmosphere at 250 degrees C. to 500 degrees C., the resulting compact is baked for ten minutes to 2 hours in a reductive atmosphere, of which an oxygen partial pressure is $10^{-5}$ to $10^{-8}$ atm, in a temperature range of 1100 degrees C. to 1300 degrees C. Thus, each compound structuring the dielectric green sheet is sintered. In this manner, the multilayer ceramic capacitor 100 is obtained. It is possible to adjust the number of the crystal grain boundaries in the extension direction of the internal electrode layer 12 after sintering by adjusting the baking condition. In concrete, when a speed of temperature increasing in the baking process is enlarged, the main component metal is sintered before the co-material is extruded from the metal conductive paste. Therefore, the co-material tends to exist in the internal electrode layer 12. The co-material existing in the internal electrode layer 12 increases the number of the crystal grain boundaries in the internal electrode layer 12. For example, it is preferable that the average speed of the temperature increasing from a room temperature to a maximum temperature in the baking process is 30 degrees C./minute or more in order that the number of the crystal grain boundaries in the internal electrode layer 12 is 1/μm or more. And it is more preferable that the average speed of the temperature increasing is 45 degrees C./minute or more. When the average speed of the temperature increasing is excessive large, an organic component existing in the compact (which is left after the process for removing the binder) is not sufficiently removed. And a defect such as a crack may occur in the baking process. And so, it is preferable that the average speed of the temperature increasing is 80 degrees C./minute or less. It is more preferable that the average speed of the temperature increasing is 65 degrees C./minute or less.

(Re-Oxidizing Process)

After that, a re-oxidizing process may be performed at 600 degrees C. to 1000 degrees C. in $N_2$ gas atmosphere.

(Plating Process)

After that, metal layers such as Cu, Ni or Su are coated on the ground layers of the external electrodes 20a and 20b by a plating process.

In the manufacturing method of the multilayer ceramic capacitor, the average length of the crystal grains of the main component metal of the internal electrode layers 12 of the surface portion S is 0.8 times or less than the average length of the crystal grains of the main component metal of the internal electrode layers 12 of the center portion C. With the method, the number of the crystal grain boundaries of the main component metal of the internal electrode layers 12 of the surface portion S is large. Therefore, the crystal grain boundaries suppress the sliding of the crystal grains. And the strength of the internal electrode layers 12 of the surface portion S increases. Therefore, the thermal shock resistance is improved. Accordingly, even if the thickness of the cover layer 13 is reduced, it is possible to secure the reliability. On the other hand, the average length of the crystal grains of the main component metal of the internal electrode layers 12 of the center portion C gets relatively larger. It is therefore possible to suppress increasing of the ESR of the whole of the multilayer ceramic capacitor 100.

The first thickness of the surface portion S is a length in the stacking direction from the outermost internal electrode layer 12. For example, it is preferable that the first thickness is ⅒ of the size of the multilayer structure in the stacking direction. In this case, the region of the surface portions S is not excessively large, and the region of the center portion C is not excessively large. It is therefore possible to improve the thermal shock resistance and suppress increasing of the ESR. The center portion C is a region sandwiched by the two surface portions as illustrated in FIG. 2.

When the average speed of temperature increasing from the room temperature to the maximum temperature is adjusted in the baking process, the number of the crystal grains in the internal electrode layers 12 of the center portion C can be 1.0/μm or more in the extension direction of the internal electrode layers 12. With the method, the number of the crystal grains is sufficiently large. It is preferable that the number of the crystal grains in the internal electrode layers 12 of the center portion C is 1.8/μ or more in the extension direction of the internal electrode layers 12. From the viewpoint of the average length of the crystal grains, it is preferable that the average length of the crystal grains in the internal electrode layers 12 of the center portion C is 0.7 μm or less in the extension direction of the internal electrode layers 12. It is possible to measure the number of crystal grains in the cross section (the cross section of FIG. 2) regulated by the facing direction of the external electrodes 20a and 20b and the stacking direction of the internal electrode layers 12. For example, a length of a case where a straight line in the extension direction of the internal electrode layers 12 crosses 200 crystal grains may be measured, and the number of crystal grains per 1 μm may be measured, as the number of the crystal grains.

It is preferable that the average thickness "a" of the internal electrode layers 12 of the center portion C is larger than the average thickness "a" of the internal electrode layers 12 of the surface portions S, in order to suppress increasing of the ESR of the whole of the multilayer ceramic capacitor 100. In order to sufficiently achieve the effect, it is preferable that the average thickness "a" of the internal electrode layers 12 of the center portion C is 1.2 times or more than the average thickness "a" of the internal electrode layers 12 of the surface portions S.

EXAMPLES

The multilayer ceramic capacitors in accordance with the embodiment were made and the property was measured.

A necessary additive compound was added to a barium titanate powder of which an average grain diameter is 100 nm (a specific surface area of 10 m²/g). The resulting barium titanate powder was sufficiently wet-blended and crushed with a ball mil. Thus, the dielectric material was obtained. An organic binder and a solvent were added to the dielectric material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added.

Next, the conductive paste for forming the internal electrode layer was formed by a planetary boll mill. The conductive paste included a main component metal (Ni) powder of the internal electrode layer 12 (50 wt % of Ni solid content), 10 weight part of a co-material (barium titanate), 5 weight part of binder (ethyl cellulose), a solvent and an auxiliary as needed. As shown in Table 1, in an example and a comparative example 1, the average grain diameter of the main component metal powder was 70 nm (a specific surface area was 10 $m^2/g$). The standard deviation of the grain diameter of the main component metal powder was 12. The inclination of the accumulated grain size distribution was 8. The average grain diameter of the co-material was 8.6 nm (a specific surface area was 110 $m^2/g$). The standard deviation of the grain diameter of the co-material was 2.7. The inclination of the accumulated grain size distribution of the co-material was 7. In a comparative example 2, the average grain diameter of the main component metal powder was 12 nm (a specific surface area was 6 $m^2/g$). The standard deviation of the grain diameter of the main component metal powder was 33. The inclination of the accumulated grain size distribution was 6. The average grain diameter of the co-material was 29 nm (a specific surface area was 40 $m^2/g$). The standard deviation of the grain diameter of the co-material was 8.7. The inclination of the accumulated grain size distribution of the co-material was 5.

comparative example 2, the average grain diameter of the main component metal of the internal electrode layers 12 was large. Therefore, the average length "b" of the crystal grains was large in both of the surface portions S and the center portion C.

The binder was removed from the ceramic multilayer structure in $N_2$ atmosphere. After that, the metal paste including the metal filler of which a main component was Ni, the co-material, the binder and the solvent was coated from the both edge faces to the side faces of the ceramic multilayer structure and was dried. After that, the resulting multilayer structure was baked together with the metal paste for 10 minutes to 2 hours in a reductive atmosphere in a temperature range of 1100 degrees C. to 1300 degrees C. And, a sintered structure was formed. The average speed of temperature increasing from a room temperature to a maximum temperature was 55 degrees C./minute in the example and comparative examples 1 and 2.

The resulting sintered structure had a length of 0.6 mm, a width of 0.3 mm and a height of 0.3 mm. The sintered structure was subjected to a re-oxidation process at 800 degrees C. in $N_2$ atmosphere. After that, by a plating process, a Cu-plated layer, a Ni-plated layer and a Sn-plated layer were formed on a surface of a ground layer of the external electrodes 20a and 20b. And, the multilayer ceramic capacitor 100 was obtained.

Figure 7A:
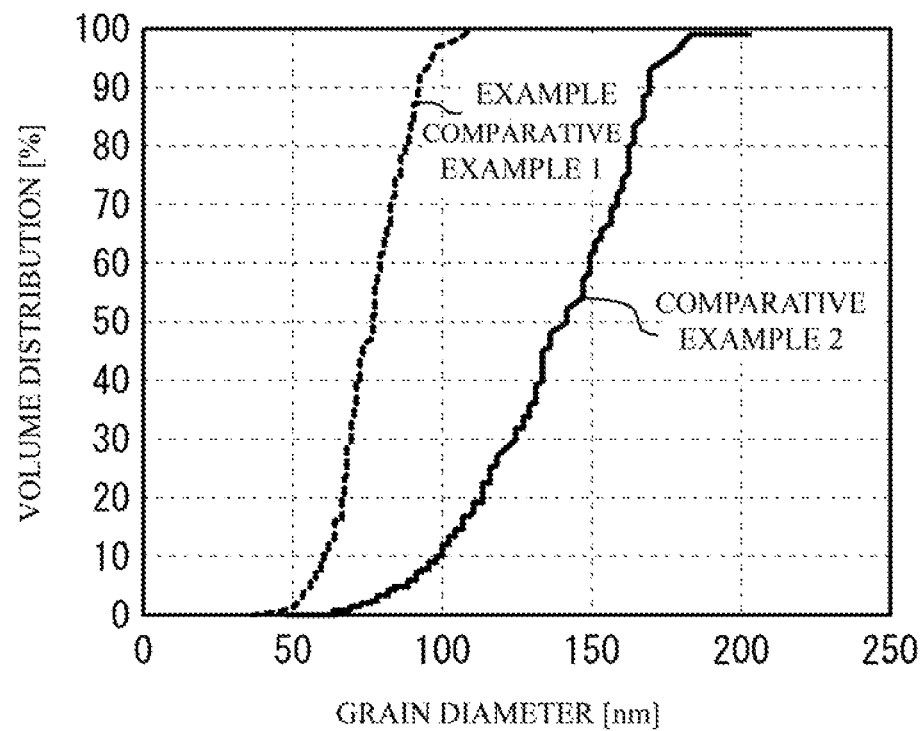
FIG. 7A illustrates grain size distribution of a main component metal of a conductive paste for forming an internal electrode of an example and comparative examples 1 and 2.

FIG. 7A illustrates grain size distribution of the main component metal of the conductive paste for forming the internal electrode layer of the example and grain size distribution of the main component metal of the conductive

TABLE 1

|  |  | AVERAGE GRAIN DIAMETER | STANDARD DEVIATION | INCLINATION OF ACCUMULATED GRAIN SIZE DISTRIBUTION |
|---|---|---|---|---|
| EXAMPLE, COMPARATIVE EXAMPLE 1 | MAIN COMPONENT METAL | 70 nm | 12 | 8 |
|  | CO-MATERIAL | 8.6 nm | 2.7 | 7 |
| COMPARATIVE EXAMPLE 2 | MAIN COMPONENT METAL | 120 nm | 33 | 6 |
|  | CO-MATERIAL | 29 nm | 8.7 | 5 |

Figure 7B:
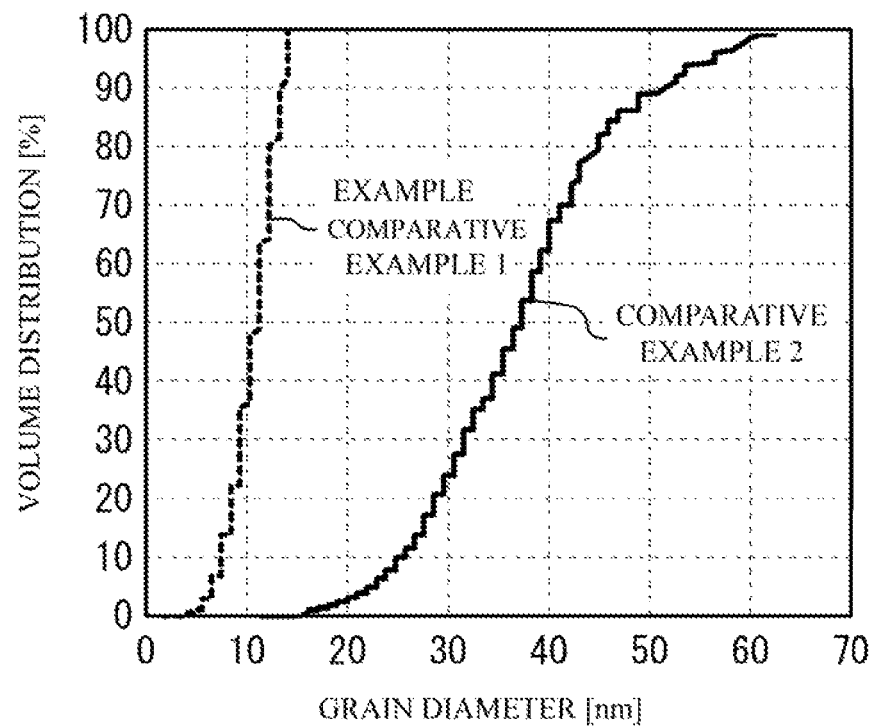
FIG. 7B illustrates grain size distribution of co-materials of a conductive paste for forming an internal electrode of an example and comparative examples 1 and 2.

The conductive paste for forming the internal electrode layer was screen-printed on the dielectric green sheet. 250 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size. In the example, during the compressing, the ceramic multilayer structure was sandwiched by silicone rubber sheets from an upper side and a lower side. The silicone rubber sheets have a relatively small thickness and have a base of PET. Therefore, the filing degree of the surface portions S was enlarged. In the comparative examples 1 and 2, the ceramic multilayer structure was sandwiched by silicone rubber sheets from an upper side and a lower side. The silicone rubber sheets have a relatively large thickness and has a base of PET. Therefore, the ceramic multilayer structure is compressed so that both of the surface portions S and the center portion C was evenly compressed and filled. As shown in the table 1, in the paste for forming the internal electrode layer of the comparative examples 1 and 2. As illustrated in FIG. 7A, in the example and the comparative example 1, a metal powder of which the average grain diameter was small and of which grain size distribution was sharp was used. In the comparative example 2, a metal powder of which the average grain diameter was large and of which the grain size distribution was broad was used. FIG. 7B illustrates the grain size distribution of the co-material of the conductive paste for forming the internal electrode layer of the example and the co-material of the conductive paste for forming internal electrode layer of the comparative example 1. As illustrated in FIG. 7B, in the example and the comparative example 1, the average grain diameter of the co-material was small, and the grain size distribution of the co-material was sharp. In the comparative example 2, the average grain diameter of the co-material was large, and the grain size distribution of the co-material was broad.

(Analysis)

The crack and the ESR characteristic of each sample were measured in the example and the comparative examples 1 and 2. With respect to the crack, each sample was extracted from an oven of 250 degrees C. And each sample was rapidly cooled by a cooling spray. A sample of which a crack occurrence was 1% or more was determined as NG. With respect to the ESR characteristic, a sample of which an ESR value at 1 MHz measured by an impedance analyzer was 50 mΩ or more was determined as NG. The measured results are shown in a table 2. As shown in table 2, in the comparative example 1, the crack was not determined as NG. However, the ESR characteristic was determined as NG. In the comparative example 2, the ESR characteristic was not determined as NG. However, the crack was determined as NG. On the other hand, in the example, neither the crack nor the ESR characteristic was determined as NG

TABLE 2

|  | CRACK | ESR |
|---|---|---|
| EXAMPLE | OK | OK |
| COMPARATIVE EXAMPLE 1 | OK | NG |
| COMPARATIVE EXAMPLE 2 | NG | OK |

Figure 8A:
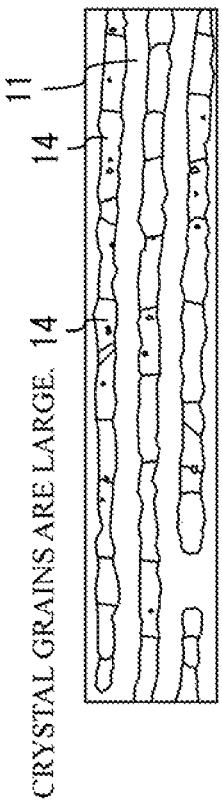
FIG. 8A to FIG. 8F illustrate SEM images of cross sections of a dielectric layer and an internal electrode layer in a stacking direction.
Figure 8B:
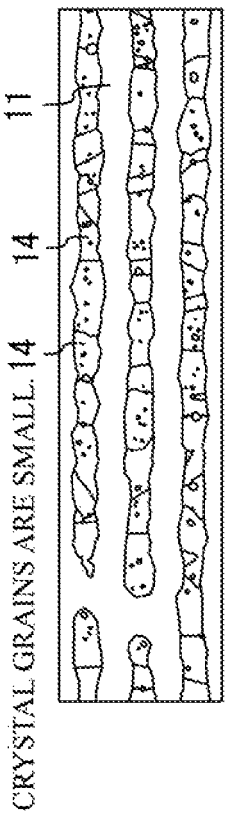
Figure 8C:
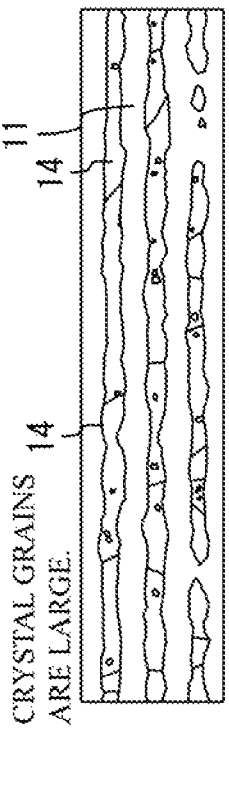
Figure 8D:
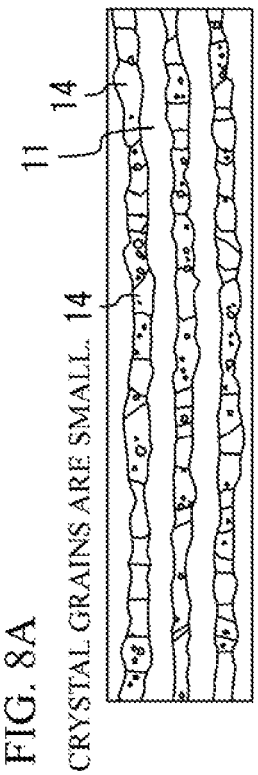
Figure 8E:
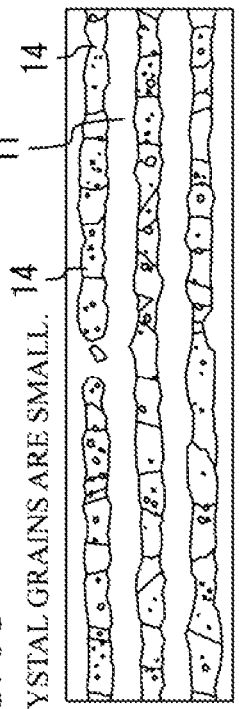
Figure 8F:
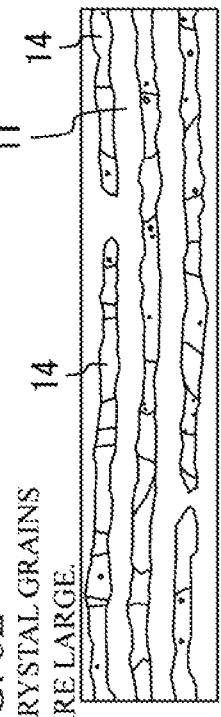

FIG. 8A to FIG. 8F illustrate SEM (Scanning Electron Microscope) images of cross sections of the dielectric layer 11 and the internal electrode layer 12 in the stacking direction. FIG. 8A illustrates a SEM image of the surface portion S of the example. FIG. 8B illustrates a SEM image of the center portion C of the example. FIG. 8C illustrates a SEM image of the surface portion S of the comparative example 1. FIG. 8D illustrates a SEM image of the center portion C of the comparative example 1. FIG. 8E illustrates a SEM image of the surface portion S of the comparative example 2. FIG. 8F illustrates a SEM image of the center portion C of the comparative example 2.

From the results of FIG. 8A to FIG. 8F, an average length "b" of crystal grains of the main component metal of the internal electrode layers 12 in the extension direction (the direction from the external electrode 20a to the external electrode 20b) was measured. A field of view of the SEM images was 12.6 μm×8.35 μm. In concrete, the length of the crystal grains was the length of the longest portion of each crystal grain 14 in the extension direction of the internal electrode layers 12 from the external electrode 20a to the external electrode 20b. The average length "b" of the crystal grains was an average of lengths of the crystal grains 14.

Figure 9A:
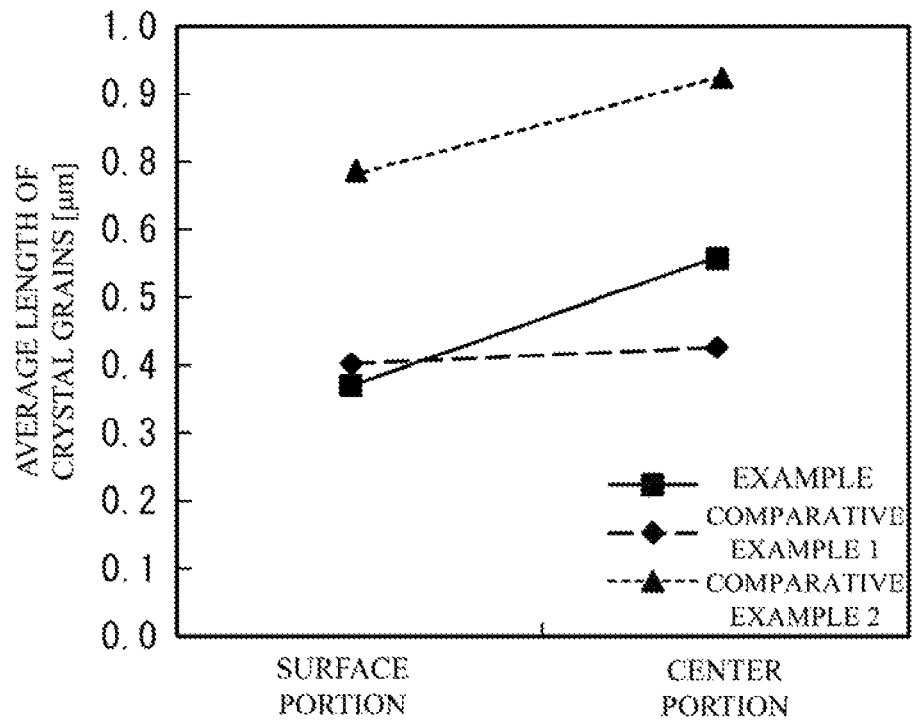
FIG. 9A illustrates an average length "b" of crystal grains of a main component metal of internal electrode layers of surface portions S and a center portion C.
Figure 9B:
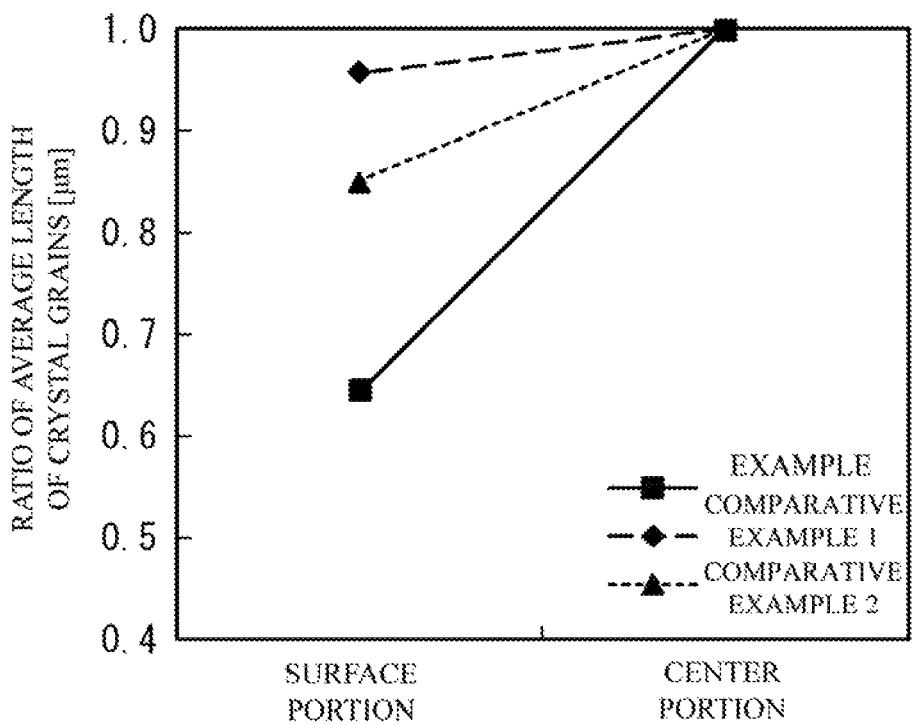
FIG. 9B illustrates normalized values of FIG. 9A.

A table 3 and FIG. 9A show the average lengths "b" of the crystal grains of the main component metal of the internal electrode layers 12 of the surface portion S and the center portion C. A table 4 and FIG. 9B show normalized values of the Table 3 and FIG. 9A. As shown in the table 3, the table 4, FIG. 9A and FIG. 9B, in the example and the comparative examples 1 and 2, the average length "b" of the crystal grains of the main component metal of the internal electrode layers 12 of the surface portion S was shorter than that of the center portion C. In the comparative examples 1 and 2, the average length "b" of the crystal grains of the main component metal of the internal electrode layers 12 of the surface portion S was more than 0.8 times of that of the center portion C. On the other hand, in the example, the average length "b" of the crystal grains of the main component metal of the internal electrode layers 12 of the surface portion S was less than 0.8 times of that of the center portion C.

TABLE 3

AVERAGE LENGTH (μm) OF CRYSTAL GRAINS

|  | SURFACE PORTION S | CENTER PORTION C |
|---|---|---|
| EXAMPLE | 0.36 | 0.56 |
| COMPARATIVE EXAMPLE 1 | 0.40 | 0.42 |
| COMPARATIVE EXAMPLE 2 | 0.77 | 0.92 |

TABLE 4

RATIO OF AVERAGE LENGTH OF CRYSTAL GRAINS

|  | SURFACE PORTION S | CENTER PORTION C |
|---|---|---|
| EXAMPLE | 0.64 | 1.00 |
| COMPARATIVE EXAMPLE 1 | 0.96 | 1.00 |
| COMPARATIVE EXAMPLE 2 | 0.84 | 1.00 |

In the comparative example 1, it is thought that the occurrence of the crack was suppressed because the number of crystal grain boundaries of the main component metal of the internal electrode layers 12 of the surface portion S was large and the crystal grain boundaries suppressed the sliding of the crystal grains. On the other hand, it is thought that the ESR characteristic was totally degraded because the number of the crystal grain boundaries of the main component metal of the internal electrode layers 12 of the center portion C was also large.

In the comparative example 2, it is thought that the degradation of the ESR characteristic was suppressed because the number of crystal grain boundaries of the main component metal of the internal electrode layers 12 was small in both of the surface portion S and the center portion C. On the other hand, it is thought that a crack occurred because the number of crystal grain boundaries of the main component metal of the internal electrode layers of the surface portion S was small and the grain boundaries did not suppress the sliding of the crystal grains.

On the other hand, in the example, the average length "b" of the crystal grains of the main component metal of the internal electrode layers 12 of the surface portion S was less than 0.8 times of that of the center portion C. Therefore, the average length "b" of the crystal grains of the main component metal of the internal electrode layers 12 of the surface portion S was sufficiently small, and the average length "b" of the crystal grains of the main component metal of the internal electrode layers 12 of the center portion C was sufficiently large. It is thought that as a result, the occurrence of the crack was suppressed, and the degradation of the ESR characteristic was suppressed.

Although the embodiments of the present invention have been described in detail, it is to be understood that the various change, substitutions, and alterations could be made hereto without departing from the spirit and scope of the invention.

What is claimed is:
1. A multilayer ceramic capacitor comprising:
   a multilayer structure in which each of dielectric layers and each of internal electrode layers are alternately stacked, a main component of the dielectric layers being ceramic,
   wherein:

a co-material of which a main component is ceramic is enclosed in each of the internal electrode layers;

the multilayer structure comprises surface portions and a center portion in a stacking direction of the dielectric layers and the internal electrode layers, the surface portions having a first thickness from a surface of the multilayer structure, the center portion being next to the surface portion in the stacking direction and having a second thickness; and an average length of crystal grains of a main component metal of the internal electrode layers of the surface portions is 0.80 times or less than an average length of crystal grains of a main component metal of the internal electrode layers of the center portion.

2. The multilayer ceramic capacitor as claimed in claim 1, wherein the first thickness is 1/10 of a size of the multilayer structure in the stacking direction.

3. The multilayer ceramic capacitor as claimed in claim 1, wherein a number of crystal grain boundary of the main component metal of the internal electrode layers of the center portion is 1/μm or more in an extension direction of the internal electrode layers.

4. The multilayer ceramic capacitor as claimed in claim 1, wherein an average thickness of the internal electrode layers of the center portion is larger than an average thickness of the internal electrode layers of the surface portions.

5. The multilayer ceramic capacitor as claimed in claim 4, wherein an average thickness of the internal electrode layers of the center portion is 1.2 times or more than an average thickness of the internal electrode layers of the surface portion.

6. The multilayer ceramic capacitor as claimed in claim 1, wherein an average length of crystal grain of the main component metal of the internal electrode layers is an average of 200 points of the internal electrode layers.

7. The multilayer ceramic capacitor as claimed in claim 3, wherein a number of crystal grain boundary of the main component metal of the internal electrode layers is an average of 200 points of the internal electrode layers.

8. The multilayer ceramic capacitor as claimed in claim 4, wherein an average thickness of the internal electrode layers is an average of 200 points of the internal electrode layers.

9. The multilayer ceramic capacitor as claimed in claim 3, wherein the internal electrode layers of the center portion include the co-material located on the crystal grain boundary.

10. The multilayer ceramic capacitor as claimed in claim 9, wherein the co-material is located inside in a thickness direction of the internal electrode layers.

11. The multilayer ceramic capacitor as claimed in claim 3, wherein each internal electrode layer of the center portion and the surface portion includes a plurality of crystal grains of the main component metal, the plurality of crystal grains being arrayed in an extension direction of the each internal electrode layer and contacting to each other, each of the plurality of crystal grains contacting to two of the dielectric layers sandwiching the each internal electrode layer;

the each internal electrode layer includes a crystal boundary formed by the plurality of crystal grains and extending between the two of the dielectric layers, where the co-material exists on the crystal boundary.

* * * * *